US012776168B2

(12) United States Patent
Symineakis et al.

(10) Patent No.: US 12,776,168 B2
(45) Date of Patent: Oct. 27, 2026

(54) SCENARIO DETECTION AND RETENTION MECHANISM FOR VEHICLE NETWORK LOGGER SYSTEM

(71) Applicant: GM Cruise Holdings LLC, San Francisco, CA (US)

(72) Inventors: Paraskevas Syminelakis, Pittsburgh, PA (US); Riccardo Pavesi, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 147 days.

(21) Appl. No.: 18/406,749

(22) Filed: Jan. 8, 2024

(65) Prior Publication Data

US 2025/0225822 A1 Jul. 10, 2025

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
None
See application file for complete search history.

(56) References Cited

U.S. PATENT DOCUMENTS

2017/0287232 A1* 10/2017 Devdutt ................... G07C 5/02
2021/0224666 A1* 7/2021 Kawashima ......... G07C 5/0808
2022/0180250 A1* 6/2022 Jeffery ................... G06N 20/00
2023/0267782 A1* 8/2023 Ucar ...................... G07C 5/085 701/31.7
2023/0391360 A1* 12/2023 Zhu ..................... G06F 21/6245
2023/0403235 A1* 12/2023 Yao ..................... H04L 67/1008
2024/0212396 A1* 6/2024 Wolf ....................... H04L 67/12
2025/0137811 A1* 5/2025 Kaku .................. G06N 3/0464

* cited by examiner

*Primary Examiner* — Ramon A. Mercado
*Assistant Examiner* — David Ruben Pedersen
(74) *Attorney, Agent, or Firm* — Honigman LLP; Matthew H. Szalach

(57) ABSTRACT

A vehicle network logging system (VNLS) is described and includes a novel scenario detection and retention (NSD&R) module for receiving data segments comprising scenes, the NSD&R module configured to featurize the received segments based on the scenes comprising the segments, wherein the segments comprise sensor data collected by onboard sensors of a vehicle on which the VNLS is installed; assign the featurized segments to respective bins based on the featurization, wherein each of the bins is assigned to one of a plurality of coverage tiers; randomly select one of the segments from the bins assigned to a lowest one of the coverage tiers; and retain the selected one of the segments in the VNLS.

17 Claims, 5 Drawing Sheets

SCENARIO DETECTION AND RETENTION MECHANISM FOR VEHICLE NETWORK LOGGER SYSTEM

BACKGROUND

Technical Field

The present disclosure relates generally to autonomous vehicles (AVs) and, more specifically, to techniques for detection and retention of novel scenarios for a vehicle network logger system (VNLS) in connection with such AVs.

INTRODUCTION

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
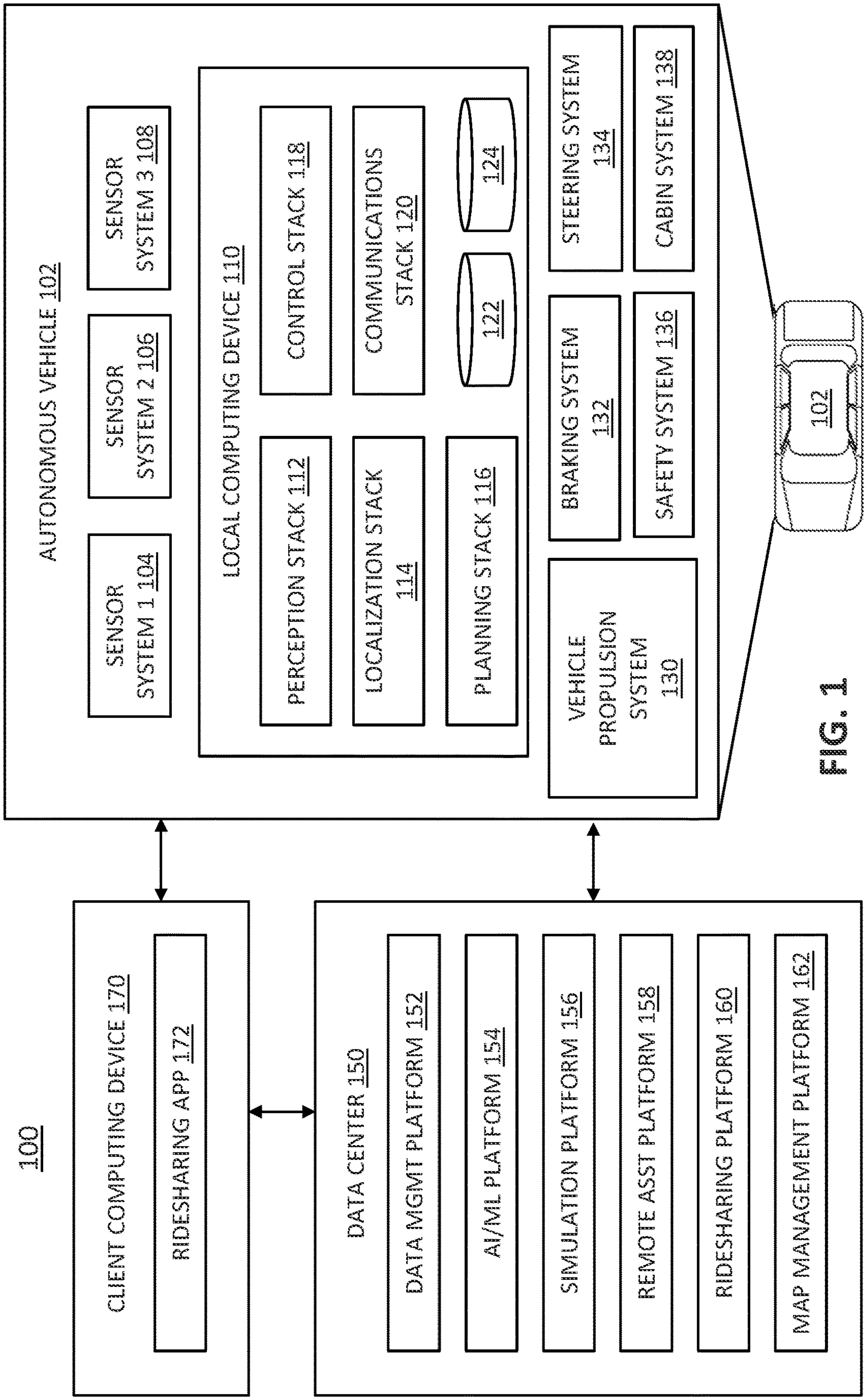
FIG. 1 illustrates an example system environment that can be used to facilitate AV (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

Throughout operation of an AV (e.g., a drive), various information in connection with the AV may be logged by a vehicle network logger system (VNLS) on board the AV. In the context of AVs and as used herein, the term logger refers to an application that stores to persistent media relevant information about various hardware/software devices on an AV during operation of the AV. This data may later be uploaded to the cloud for parsing in order to understand what might have happened during a drive and/or recreate a drive in its entirety on equivalent hardware, for example. The saved data may include (1) all information input to an AV stack of an AV (for example, all sensor data), (2) the output of any non-deterministic calculations and/or (3) states of different software modules. The information may be used for a variety of purposes, including debugging of software modules, legal compliance, model training, and performance improvements (especially with regard to the AV stack).

In particular embodiments, an AV logger logs data deemed necessary (e.g., due to legal and/or safety requirements), as well as some data that may not be deemed necessary but has been identified as being desirable for one or more reasons, for the entirety of a drive, which data is stored to one or more disks of the VNLS. Some or all of the stored data is offloaded to the cloud, for example, when the AV returns to the garage. As the size of an AV fleet increases, the amount of data logged may need to be reduced (or at least optimized) to reduce onboard hardware costs, offload times, and offload storage costs. Moreover, as sensor traffic between AV automated driving systems computers (ADSCs) and a network switch increases, the overall amount of data logged may need to be scaled accordingly.

In view of the foregoing, techniques have been developed to reduce the total amount of data logged and stored by a VNLS. Three areas in which such a reduction may be beneficial include on the AV itself (reducing the vehicle disk storage space), during offloading (reducing offload time and bandwidth), and in the cloud (reducing storage costs). One manner in which the amount of data logged per vehicle may be reduced includes limiting the types of data that are logged during a drive to data associated with predefined triggers and/or topics, which are typically related to safety. As a result, data related to novel scenarios (i.e., scenarios that are not often "seen" by an AV) that may be useful for testing and training but that is not necessarily safety related and for which a trigger would likely not be defined, is typically not logged, retained, or offloaded due to storage constraints described above.

In accordance with features of embodiments described herein, an on-vehicle system enables selective retention of AV data, referred to herein as segments, based on considerations related to coverage and is able to estimate exposure rates and/or identify new (novel) exposures that have not been previously conceived in a preemptive manner. In particular, coverage sampling techniques may be used to encode current coverage of scenarios in terms of a discrete portion of scenario (or feature) space and the number of globally available segments in each part. Low covered parts or parts with no coverage are prioritized for retention. Additionally, reservoir sampling is performed to select a random sample for retention. In particular embodiments, the aforementioned proposal requires the availability of a fixed number (e.g., 1) of retention slots per drive. Additionally, a featurization procedure employed to process segments should have low latency.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110*a*-110*e*), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example System for Novel Scenario Detection and Retention in VNLS

Figure 2:
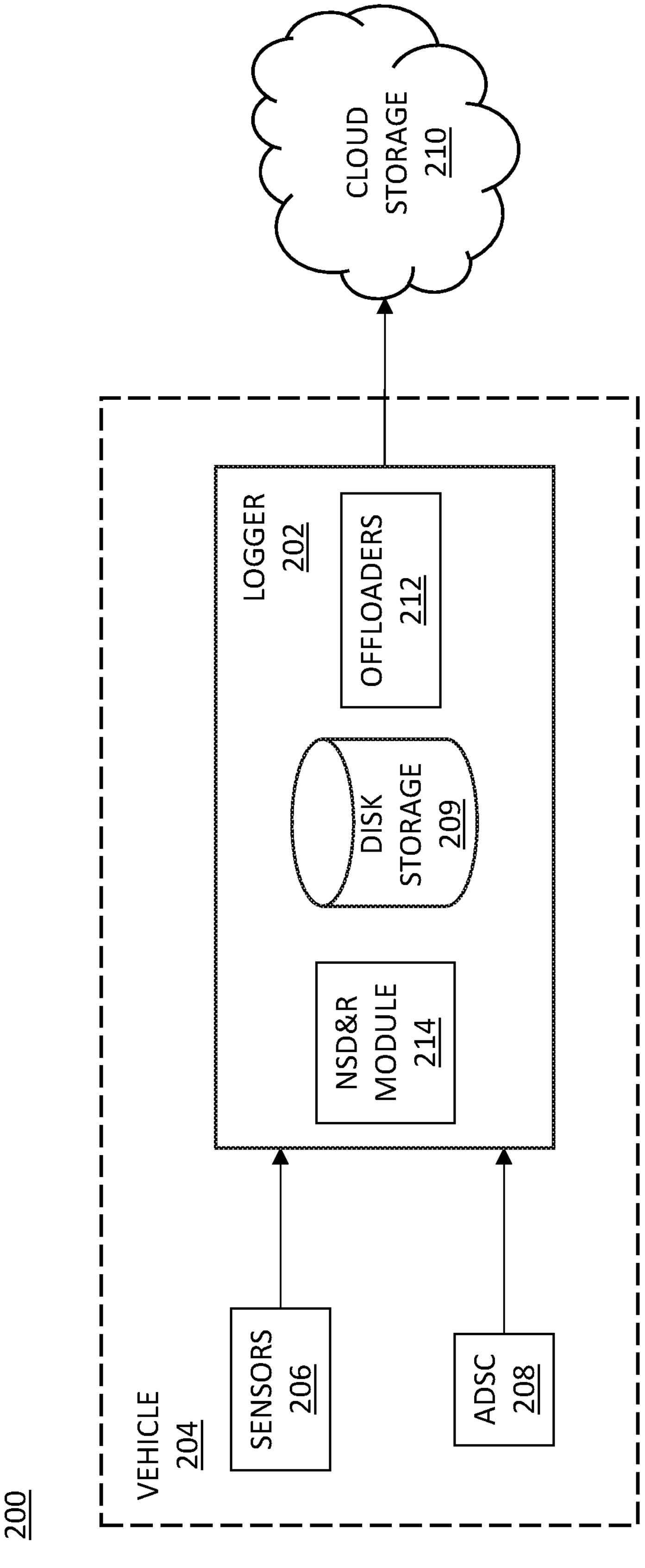
FIG. 2 illustrates a simplified block diagram of a vehicle network logger system (VNLS) according to some aspects of the disclosed technology.

FIG. 2 illustrates a simplified diagram of an example system for performing selective logging in a VNLS in accordance with features of particular embodiments. As shown in FIG. 2, system 200 includes a logger 202 installed on a vehicle 204, which may be identical in all relevant respects to AV 102 (FIG. 1). Logger 202 receives data from onboard sensors 206 and ADSC 208, stores selected portions of data to local storage 209, and offloads data from local storage to cloud storage 210 using offloaders 212, which may include one or more of cellular connections, Wi-Fi connections, and disks. Offloaded data is uploaded from offloaders 210 to cloud storage 212 either manually (e.g., in the case of disks) or automatically (e.g., in the case of cellular and Wi-Fi). In particular embodiments, logger data may be managed, stored, and transferred in units referred to as segments, each of which corresponds to a rolling time window having a predetermined length (e.g., 10 seconds).

Referring again to FIG. 2, in accordance with features of embodiments described herein, logger 202 may include a novel scenario detection and retention (NSD&R) module 214. Current exposure tools deployed in connection with AV data are not designed to capture unknown exposure events (or exposures) or exposures that are not explicitly defined. Many such exposures need to be estimated by fully logged segments, if possible, but such segments are often sourced from supervised driving and as a result are biased (i.e., do not represent the bulk of driving) and may be restricted by a limited (e.g., 30 day) retention policy. As a result, it is difficult to constantly estimate driverless exposures on an evolving set of exposures and to preemptively identify novel exposures.

Such novel scenarios, or exposures, may include, but are not limited to, (1) scenarios in which objects are dangling from a trunk of a car or bed of a pickup truck, (2) scenarios in which other vehicles are swerving and/or skidding in the vicinity of the AV due to a combination of high speed and heavy rain or other precipitation, and/or (3) scenarios in which other road occupants are exhibiting road rage behavior. Scenario 1 may be a concern because the dangling objects may fall from the vehicle carrying the objects into the path of the AV. Alternatively, even if the objects do not fall, the AV's perception stack may have difficulty identifying the objects. Scenarios 2 and 3 may be a concern because the behavior of the other vehicle may pose a direct or indirect risk to the AV that the fleet could be trained to avoid over time with sufficient training data.

Figure 3:
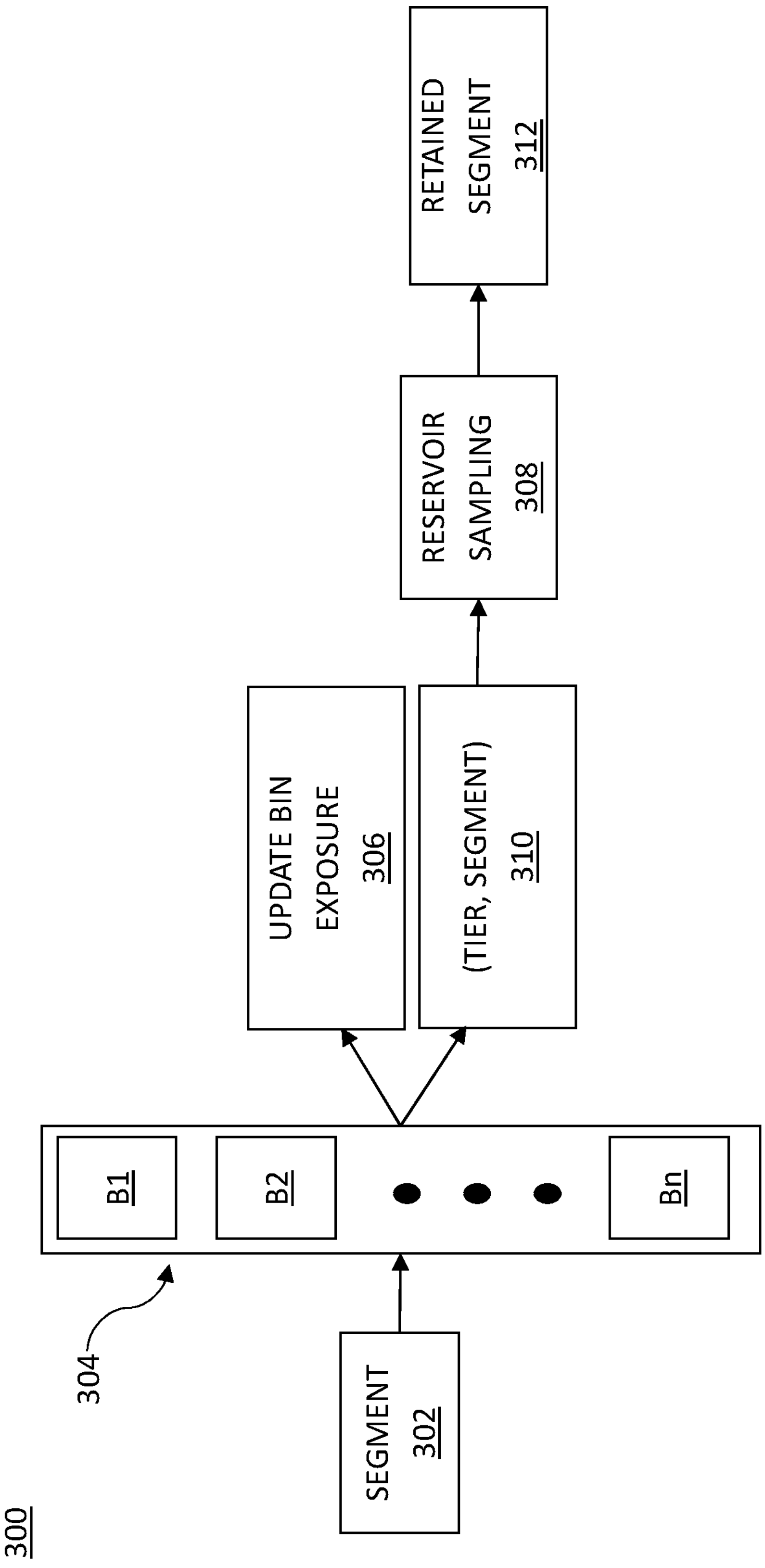
FIGS. 3 and 4 illustrate operation of a novel scenario detection and retention mechanism according to some aspects of the disclosed technology.

Referring now to FIG. 3, illustrated therein is a simplified block diagram of an example novel scenario detection and retention system 300 in accordance with features of embodiments described herein. It will be recognized that the system 300 may be used to implement the NSD&R module 214 of FIG. 2. As shown in FIG. 3, a segment 302 is received by system 300 and, after it is featurized, is assigned to one of a plurality of buckets, or bins, 304 based on features of segment 302.

As used herein, featurizing means extracting statistical values (e.g., numbers, categories, etc.) that describe and characterize a scenario, either in human-interpretable ways or in machine-learning encoded ways. This includes information about what the AV is intending to do, what the other agents are doing, what the environment and road look like, and/or anything else that might be relevant by affecting the AV decision making ability. Such information could also include commercially relevant information about road conditions, road actors, and/or real estate, with the understanding that locally applicable privacy laws and stipulations are always observed and adhered to.

In particular embodiments, each of the buckets 304 has assigned thereto a coverage tier based on the coverage observed thus far for the scene (or scenario) comprising the segment in the database of the fleet operator. For example, a bucket may be designated as Tier 0 if the scene is defined as novel (i.e., no segments comprising the scene in the fleet operator database), as Tier 1 if there are fewer than 10 segments comprising the scene in the fleet operator database, and as Tier 2 if there are between 11 and 100 segments comprising the scene in the fleet operator database. It will be recognized that, while only three coverage tiers are described, more or fewer such tiers may be defined as useful and/or desirable for a particular implementation. In a bucket-based implementation, each of n buckets are described based on features and scenes are assigned to a predefined bucket based on featurization of the scene or a new bucket can be defined if a scene does not fall into any of the previously defined buckets. In a center-based implementation, the buckets can be defined in terms of distances to their centers and if a new scene is far from all of the centers, the scene is defined as being novel. The distances could be defined in a variety of different ways (Euclidean, Mahalanobis, or perhaps even model-based). The distance threshold considered can be fixed per bucket or can be locally varying depending on the relative location of the new scene in feature space compared to the centers.

A bin exposure update process 306 may be performed on the bins 304. The bin exposure update may be performed as soon as the process 304 is concluded and concurrently with the 310 process. It involves updating a counter (weighted or unweighted) measuring an occurrence rate of events in the bin assigned by process 304. It can also keep track of the current mileage of the AV since the last time it offloaded data.

Additionally, a reservoir sampling process 308 may be performed on the segment/coverage tier information 310 to sample segments uniformly within each tier and whenever a segment of a lowest coverage tier is found, a segment retained from higher coverage tiers is evicted and the segment of the lower coverage tier is retained 312. In this manner, the invariant of retaining a random sample from the lowest observed coverage tier is maintained.

Example Techniques for Novel Scenario Selection and Retention in VLNS

Figure 4:
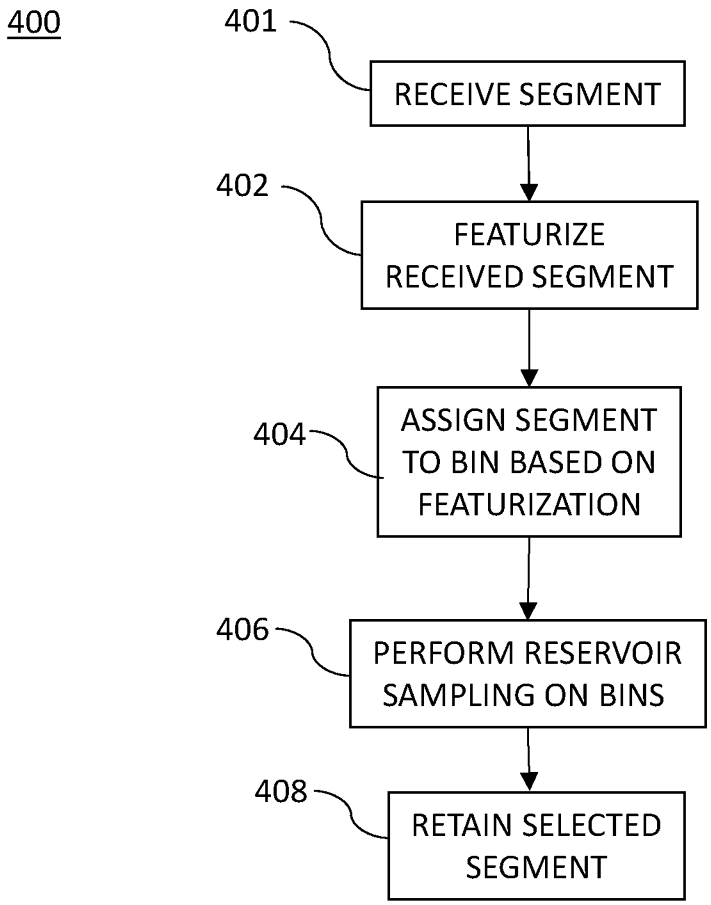

FIG. 4 is a flowchart 400 illustrating example operations that may be performed by an NSD&R module, such as the module 214, of a VNLS, such as logger 202, in accordance with particular embodiments. In certain embodiments, one or more of the operations illustrated in FIG. 4 may be executed by one or more of the elements shown in FIGS. 1, 2, and/or 3.

In 401, a segment is received at the logger.

In 402, the segment received at 401 is featurized. In particular embodiments, featurization of a segment involves identifying and/or classifying a scene comprising the segment based on features identified therein. As used herein, segment refers to all the information that the AV retains for a specific window of time, e.g. for all timestamps in the interval [start_timestamp, end_timestamp]. As the AV is driving, this window is updated on a rolling basis. The overall system may be synchronized with the cadence that the segment is updated.

In 404, the featurized segment is assigned to a bin based on results of the featurization process. For example, if the segment comprises a scene including a school bus, the segment may be assigned to a bin comprising school bus scenes. Alternatively, if the segment comprises a scene including a truck with a load of lumber extending from the back of the truck bed, the segment may be assigned to a bin comprising scenes including vehicles with objects dangling from the back, for example. The bins may also be quite complex involving a variety of information such as traffic density, traffic light states, projected vehicle trajectories in relation to the AV and/or many other conceivable scene descriptors. Furthermore, in some instantiations of embodiments described herein, the bins defined are not interpretable by humans but express abstract partitioning of segments embedded in a latent space in which a variety of supervised and unsupervised clustering and partitioning techniques can be employed to define them.

As noted above, featurization abstractly refers to the process of extracting or compressing information from the scene or segment of driving. Such examples include but are not limited to interpretable features such as AV kinematics, other vehicle/actor's kinematics, road features, and/or weather features. Featurization may also include Machine Learning (ML)-based features that are typically outputs of on car models. The collection of data to be used later are abstractly referred to here as features.

As noted above, each bin has preassigned thereto a coverage tier. It will be recognized that coverage tiers may be assigned at the fleet management level and not at the individual vehicle level. It will be further noted that in particular embodiments, coverage tiers are static and are assigned prior to the beginning of a drive.

In 406, reservoir sampling may be performed on the bins to sample segments uniformly within each tier and to randomly select a segment from the lowest tier that has a segment observed therefor. It will be recognized that 406 may be performed using techniques other than reservoir sampling. Generally, any prioritization method can be used in place of reservoir sampling, such as FIFO and/or LIFO, for example. All of these methods have the common feature that a score is assigned to each scene/segment and then the top or bottom scenes are kept to fit in the memory budget. The score itself can be computed by a combination of an ML-based model and access to a random number generator.

In 408, the selected segment is retained within local storage of the AV, such as local storage 209. It will be recognized that the segment retained at the end of the drive will be offloaded to cloud storage (such as cloud storage 210) when other data is offloaded (e.g., by offloaders 212). It will be further recognized that a segment retained within local storage may be replaced by another lower tier segment sampled from bins prior to the end of the drive.

In the illustrated embodiment, a single segment is retained; however, it will be recognized that multiple segments may be retained in alternative embodiments so long as sufficient storage space is maintained for data designated as necessary.

Although the operations of the example method shown in and described with reference to FIG. 4 are illustrated as occurring once each and in a particular order, it will be recognized that the operations may be performed in any suitable order and repeated as desired. Additionally, one or more operations may be performed in parallel. Furthermore, the operations illustrated in FIG. 4 may be combined or may include more or fewer details than described.

It will be recognized that, in an extension of the techniques described herein, a novel scenario may be defined as any scenario for which a single (or designated number) of segments per drive should be detected and retained. In this regard, a novel scenario may include a particular model of car or a rare animal, for example. Whether a scenario is deemed novel (and placed in a Tier 0 bin) may also be dependent on a time of day at and/or a geographic location in which the scenario is detected. For

Example Processor-Based System

Figure 5:
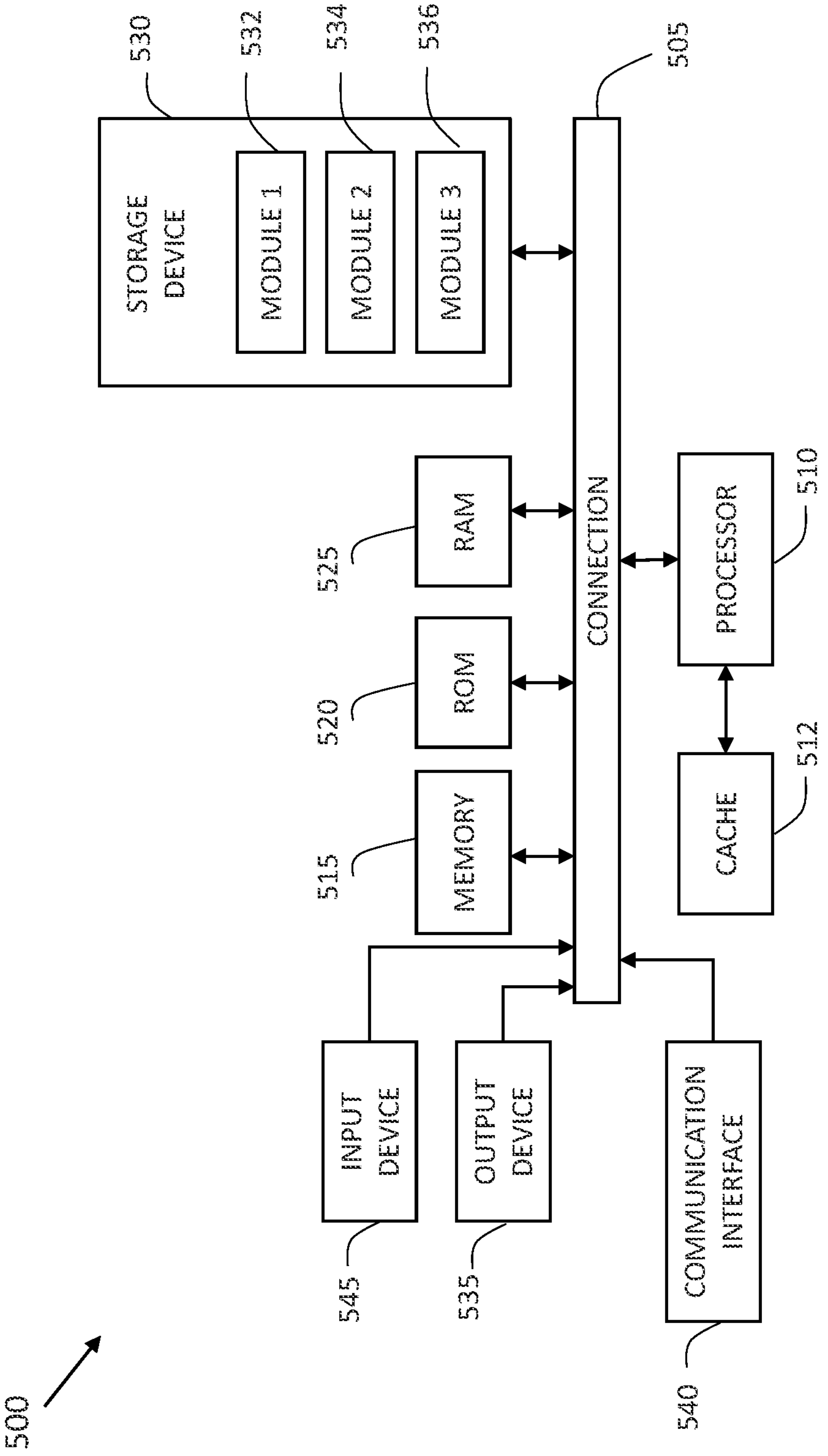
FIG. 5 illustrates an example processor-based system with which some aspects of the disclosed technology can be implemented.

FIG. 5 illustrates an example processor-based system with which some aspects of the subject technology can be implemented. For example, processor-based system 500 can be any computing device making up, or any component thereof in which the components of the system are in communication with each other using connection 5 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more GNSS receivers or transceivers that are used to determine a location of the computing system 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a VNLS comprising a novel scenario detection and retention (NSD&R) module for receiving data segments comprising scenes, the NSD&R module configured to featurize the received segments based on the scenes comprising the segments, wherein the segments comprise sensor data collected by onboard sensors of a vehicle on which the VNLS is installed; assign the featurized segments to respective bins based on the featurization, wherein each of the bins is assigned to one of a plurality of coverage tiers; randomly select one of the segments from the bins assigned to a lowest one of the coverage tiers; and retain the selected one of the segments in the VNLS.

Example 2 provides the VNLS of example 1, further comprising a local storage device, wherein the selected one of the segments is retained in a designated retention slot of the local storage device.

Example 3 provides the VNLS of example 2, further comprising an offloader for offloading the selected one of the segments from the local storage device to cloud storage.

Example 4 provides the VNLS of any of examples 1-3, wherein the randomly selecting is performed by applying reservoir sampling across the bins.

Example 5 provides the VNLS of any of examples 1-4, wherein the bins are assigned to one of the plurality of coverage tiers based on a relative novelty of the segments assigned to the bin, wherein the more novel the segments assigned to the one of the bins, the lower the coverage tier to which the one of the bins is assigned.

Example 6 provides the VNLS of any of examples 1-6, wherein the selected one of the segments comprises a novel scene.

Example 7 provides the VNLS of example 6, wherein the novel scene comprises at least one of a vehicle having an object dangling from the vehicle, behavior indicative of road range, and a vehicle swerving in a rainy environment.

Example 8 provides the VNLS of any of examples 1-7, wherein the segments are of a fixed length.

Example provides the VNLS of example 8, wherein the fixed length comprises 10 seconds.

Example 10 provides a method for detecting and retaining at least one data segment comprising a novel scene, the method comprising featurizing each of a plurality of data segments generated by an onboard sensor of an autonomous vehicle (AV) during a drive performed by the AV, wherein the featurizing comprises, for each of the data segments, processing the data segment to identify features of a scene comprising the data segment; assigning each of the featurized data segments to one of a plurality of bins based on the featurizing, wherein each of the bins is assigned to one of a plurality of coverage tiers; applying a random selection process across a subset of the bins comprising ones of the bins to which one or more of the data segments has been assigned to select at least one of the data segments from one of the bins of the subset of bins assigned to a lowest one of the coverage tiers; and retaining the selected at least one of the segments in a logging system of the AV.

Example 11 provides the method of example 10, wherein the selected at least one of the segments is retained in local disk storage of the logging system.

Example 12 provides the method of example 11, further comprising offloading the selected at least one of the segments from the local disk storage to a cloud database upon completion of the drive performed by the AV.

Example 13 provides the method of example 12, wherein each of the bins is assigned to one of a plurality of coverage tiers based on a relative rarity in the cloud database of the segments assigned to the bin, wherein the relatively rarer the segments assigned to the one of the bins are, the lower the coverage tier to which the one of the bins is assigned.

Example 14 provides the method of any of examples 10-13, wherein the applying a random selection process comprises applying reservoir sampling across a subset of the bins comprising ones of the bins to which one or more of the data segments has been assigned.

Example 15 provides the method of any of examples 10-14, wherein the selected at least one of the segments comprises a scene including at least one feature selected from a group of features consisting of a vehicle having an object dangling from the vehicle, behavior indicative of road range, and a vehicle swerving while driving in a rainy environment.

Example 16 provides one or more non-transitory computer-readable storage media comprising instructions for execution that, when executed by a processor, are operable to cause to be performed operations comprising featurizing each of a plurality of data segments generated by an onboard sensor of an autonomous vehicle (AV) during a drive performed by the AV, wherein the featurizing comprises, for each of the data segments, processing the data segment to identify features of a scene comprising the data segment; assigning each of the featurized data segments to one of a plurality of bins based on the featurizing, wherein each of the bins is assigned to one of a plurality of coverage tiers; applying a random selection process across a subset of the bins comprising ones of the bins to which one or more of the data segments has been assigned to select at least one of the data segments from one of the bins of the subset of bins assigned to a lowest one of the coverage tiers; retaining the selected at least one of the segments in a logging system of the AV; and offloading the selected at least one of the segments from the local disk storage to a cloud database subsequent to completion of the drive performed by the AV.

Example 17 provides the one or more non-transitory computer-readable storage media of example 16, wherein the selected at least one of the segments is retained in local disk storage of the logging system.

Example 18 provides the one or more non-transitory computer-readable storage media of any of examples 16-17, wherein each of the bins is assigned to one of a plurality of coverage tiers based on a relative rarity in the cloud database of the segments assigned to the bin, wherein the relatively rarer the segments assigned to the one of the bins are, the lower the coverage tier to which the one of the bins is assigned.

Example 19 provides the one or more non-transitory computer-readable storage media of any of examples 16-18, wherein the applying a random selection process comprises applying reservoir sampling across a subset of the bins comprising ones of the bins to which one or more of the data segments has been assigned.

Example 20 provides the one or more non-transitory computer-readable storage media of any of examples 16-19, wherein the selected at least one of the segments comprises a scene including at least one feature selected from a group of features consisting of a vehicle having an object dangling from the vehicle, behavior indicative of road range, and a vehicle swerving while driving in a rainy environment.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples;

and (b) does not intend, by any statement in the Specification, to limit this disclosure in any way that is not otherwise reflected in the appended examples.

What is claimed is:

1. A vehicle network logging system (VNLS) for an autonomous vehicle (AV), the VNLS comprising:
at least one processor;
non-transitory memory in communication with the at least one processor and storing instructions that, when executed by the at least one processor, cause the at least one processor to:
receive a plurality of data segments, wherein each data segment comprises respective sensor data collected by onboard sensors of the AV and represents a respective scene;
for each data segment of the plurality of data segments:
featurize the data segment based on the respective sensor data; and
assign the data segment to a respective bin of a plurality of bins based on the featurization, wherein each bin of the plurality of bins is assigned to a respective one of a plurality of coverage tiers, wherein the coverage tiers are assigned at a fleet-management level for a fleet of AVs based on a relative rarity of scenes in a cloud database across the fleet of AVs and remain static during an operation of the AV;
randomly select one of the data segments from the bins assigned to a lowest one of the coverage tiers; and
retain the selected one of the data segments in the VNLS.

2. The VNLS of claim 1, further comprising a local storage device, wherein the selected one of the data segments is retained in a designated retention slot of the local storage device.

3. The VNLS of claim 2, further comprising an offloader for offloading the selected one of the data segments from the local storage device to cloud storage.

4. The VNLS of claim 1, wherein randomly selecting one of the data segments comprises applying reservoir sampling across the plurality of bins.

5. The VNLS of claim 1, wherein the selected one of the data segments comprises a novel scene.

6. The VNLS of claim 5, wherein the novel scene comprises at least one of a vehicle having an object dangling from the vehicle, behavior indicative of road age, or a vehicle swerving in a rainy environment.

7. The VNLS of claim 1, wherein the data segments are of a fixed length.

8. The VNLS of claim 7, wherein the fixed length comprises 10 seconds.

9. A method comprising:
receiving a plurality of data segments, wherein each data segment comprises respective sensor data collected by onboard sensors of an autonomous vehicle (AV) and represents a respective scene;
for each data segment of the plurality of data segments:
featurizing the data segment based on the respective sensor data; and
assigning the data segment to a respective bin of a plurality of bins based on the featurization, wherein each bin of the plurality of bins is assigned to a respective one of a plurality of coverage tiers, wherein the coverage tiers are assigned at a fleet-management level for a fleet of AVs based on a relative rarity of scenes in a cloud database across the fleet of AVs and remain static during an operation of the AV;
randomly selecting one of the data segments from the bins assigned to a lowest one of the coverage tiers; and
retaining the selected one of the data segments in a logging system of the AV.

10. The method of claim 9, wherein the selected one of the data segments is retained in local disk storage of the logging system.

11. The method of claim 10, further comprising offloading the selected one of the data segments from local disk storage to a cloud database upon completion of a navigation performed by the AV.

12. The method of claim 9, wherein randomly selecting one of the data segments comprises applying reservoir sampling across the plurality of bins.

13. The method of claim 9, wherein the selected one of the data segments comprises a novel scene including at least one of a vehicle having an object dangling from the vehicle, behavior indicative of road age, or a vehicle swerving while driving in a rainy environment.

14. One or more non-transitory computer-readable storage media comprising instructions for execution that, when executed by a processor, are operable to cause the processor to perform operations, the operations comprising:
receiving a plurality of data segments, wherein each data segment comprises respective sensor data collected by onboard sensors of an autonomous vehicle (AV) and represents a respective scene;
for each data segment of the plurality of data segments:
featurizing the data segment based on the respective sensor data; and
assigning the data segment to a respective bin of a plurality of bins based on the featurization, wherein each bin of the plurality of bins is assigned to a respective one of a plurality of coverage tiers, wherein the coverage tiers are assigned at a fleet-management level for a fleet of AVs based on a relative rarity of scenes in a cloud database across the fleet of AVs and remain static during an operation of the AV;
randomly selecting one of the data segments from the bins assigned to a lowest one of the coverage tiers;
retaining the selected one of the data segments in a logging system of the AV; and
offloading the selected one of the data segments from the logging system to a cloud database subsequent to completion of a navigation performed by the AV.

15. The one or more non-transitory computer-readable storage media of claim 14, wherein the selected one of the data segments is retained in local disk storage of the logging system.

16. The one or more non-transitory computer-readable storage media of claim 14, wherein randomly selecting one of the data segments comprises applying reservoir sampling across the plurality of bins.

17. The one or more non-transitory computer-readable storage media of claim 14, wherein the selected one of the data segments comprises a novel scene including at least one of a vehicle having an object dangling from the vehicle, behavior indicative of road age, and a vehicle swerving while driving in a rainy environment.

* * * * *